Jan. 19, 1937.      L. H. BAILEY         2,068,619
                 TABLET MAKING MACHINE
             Filed Sept. 13, 1935      3 Sheets-Sheet 1

WITNESS:

INVENTOR
Lawrence H. Bailey
BY
Augustus B. Stoughton.
ATTORNEY.

Jan. 19, 1937.   L. H. BAILEY   2,068,619
TABLET MAKING MACHINE
Filed Sept. 13, 1935   3 Sheets-Sheet 2

INVENTOR
Lawrence H. Bailey
BY
Augustus B. Stoughton
ATTORNEY.

WITNESS.

Jan. 19, 1937. L. H. BAILEY 2,068,619
TABLET MAKING MACHINE.
Filed Sept. 13, 1935  3 Sheets-Sheet 3
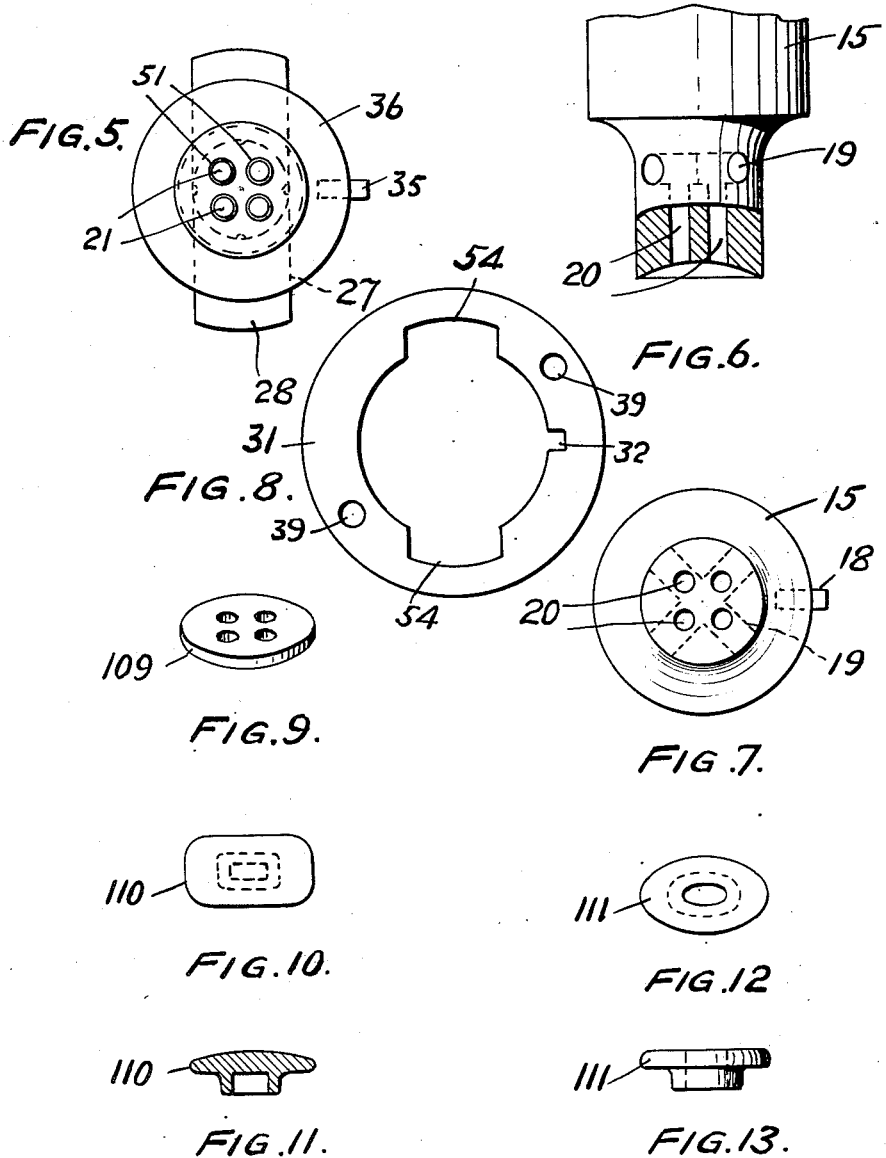
INVENTOR
Lawrence H. Bailey
BY
Augustus B. Stoughton.
ATTORNEY Patented Jan. 19, 1937

2,068,619

UNITED STATES PATENT OFFICE 2,068,619

TABLET-MAKING MACHINE

Lawrence H. Bailey, Philadelphia, Pa., assignor to F. J. Stokes Machine Company, Philadelphia, Pa., a corporation of Pennsylvania Application September 13, 1935, Serial No. 40,388

7 Claims. (Cl. 107—17)

This invention pertains to new and useful improvements in rotary tablet-compressing machines and particularly to improvements in the rotary head and in the tools used for the production of perforated tablets.

The object of my invention is to provide simple and practical means for compressing either cylindrical or irregular shaped tablets having an irregular shaped perforation and/or a plurality of perforations therein. To this end my invention includes the following features:

Means for supporting the perforating punch or punches;

Improved means for conveniently obtaining and maintaining the alignment of the several members of the total assembly regardless of the shape of tablet, perforations or the number of perforations;

Means for discharging or expelling the powder leaking through into the lower tool assembly.

Machines of this type have been used extensively for compressing cylindrical or ring-shaped tablets from powdered or plastic materials; such as sugar, phenol-formaldehyde resins, ceramics, etc., one example of such a machine being described in U. S. Patent #1,207,337 granted to Francis J. Stokes, Dec. 5, 1916. Such articles, however, were of necessity all made cylindrical in shape and with the perforation of a true circular outline centrally located. The design and manufacturing possibilities were limited to one particular shape, that of a ring. In tablets of this kind the perforation is commonly referred to as the core and the punch-member, producing this core, is usually referred to as the core-rod.

The attached drawings forming a part of this specification, show a preferred embodiment of my machine for compressing tablets or buttons having four perforations or cores.

Fig. 5 is an enlarged upper end view of a lower punch complete.

Fig. 6 is a detail view with parts in cross section of the lower end of an upper punch.

Fig. 7 is an end view of the upper punch shown in Fig. 6.

Fig. 8 shows an end view of bushing 31.

Fig. 9 is a view in elevation showing one type of button produced by this compressor.

Figs. 10, 11, 12 and 13 show some representative forms of tablets produced by suitably modified tool-assemblies.

Figure 1:
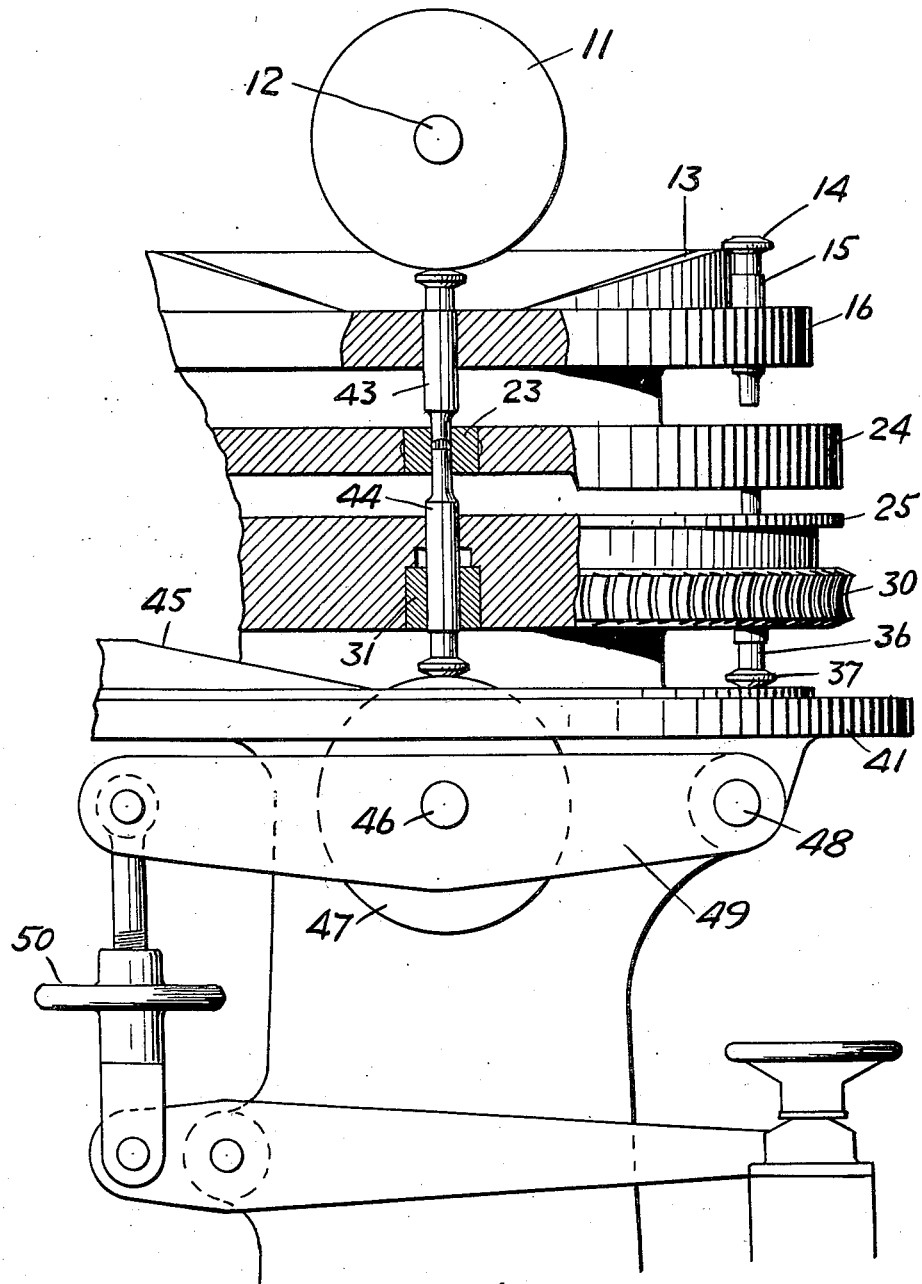
Fig. 1 is an elevational view, partly in section, of so much of a rotary compressor as is necessary to illustrate my invention, the tool-assembly is here shown compressing a tablet.

In the embodiment chosen for the illustration of my invention, particularly Fig. 1, this type of machine is usually provided with a table 41, mounted on a suitable base, and having a central spindle (not shown) thereon, around which the head rotates. A cam 13 is fastened rigidly to the spindle. As the upper punch 15 is carried around by punch holder 16, the head 14 of punch 15, which rests on cam 13, will raise or lower punch 15 to suit the cycle of operations. For controlling the endwise movements of lower punch 44, cams 45 are placed on table 41. Rollers 11 and 47 are placed at one or more points in the path of the punches and as the punches pass between these rollers the compression of the powder takes place.

Figure 2:
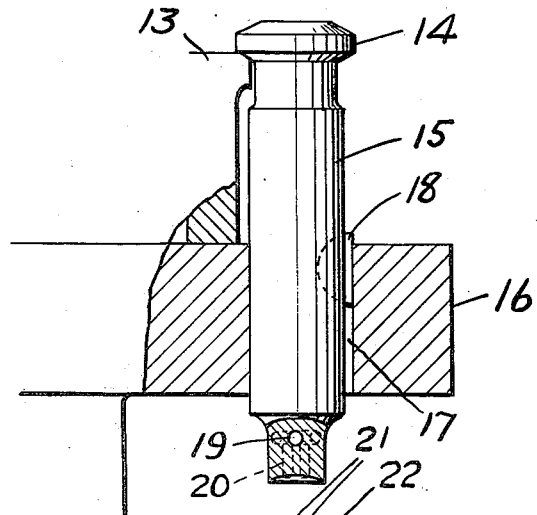
Fig. 2 is a vertical sectional view through the rotary head with the tool-assembly in position to receive a charge of powder.
Figure 4:
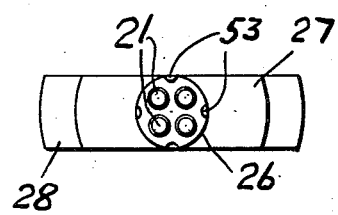
Fig. 4 is a top plan view on an enlarged scale of the core rods and holder forming part of a lower punch.

The rotating head is made up of a number of superimposed large rings or annular discs with smaller rings or necks in between forming a structure of several stories and of diameter to suit the co-acting mechanism. A plurality of apertures are spaced on the punch circle around the head and cut clear through the several stories to form bearings and seats for the various members in each tool-assembly. Any number of apertures, for example fifteen or twenty-three, may be provided to receive and support as many tool-assemblies, each tool assembly producing one tablet for each set of rolls passed every revolution. The upper punch 15 of Fig. 2 has its bearing and guide in disc 16, the corresponding die 23 is supported in disc 24 and the mating lower punch 36—with its core-rod or core-rods—has its bearing and guide in discs 25 and 30. The disc 30 may be provided with gear teeth meshing with the teeth of a pinion or worm (not shown) fastened on a shaft driven at suitable speed from a prime mover so as to impart the desired speed of rotary motion to the head. The lower roller 47, Fig. 1 usually has its axle 46 supported in a lever or carrier 49 with its fulcrum 48 fastened to the table 41, the opposite end of carrier 49 being supported by an adjustable linkage, the adjustment being accomplished through some such means as a handwheel 50.

The distance between rolls 11 and 47 is so arranged that tablets of varying thickness within the range of the machine may be made as desired by adjusting the handwheel 50 so as to change the length of the linkage to suit the thickness.

As may be understood from the above description, each set of tools or tool-assembly consists of an upper punch 15, a die 23, and a lower punch 36. It is evident that to produce a tablet of any of the shapes shown in Figs. 9 to 13, the tool-assembly not only must be in perfect axial alignment but in radial alignment as well, for the die is shaped to the exact outline of the desired tablet and the punches have a snug sliding fit in the die. To prevent upper punch 15 from rotating, I provide a key 18 fastened into the shank of punch 15 and engaging a key-way 17 in bearing 16. I have shown here, what is commonly known as a Woodruff key, as the means of guiding and keeping punch 15 in radial alignment but any other means may be used such as a square or polygonal punch shank fitting into a bearing of corresponding shape.

Die 23 is inserted in its holder 24 and if the mold is of irregular shape the die is turned until in perfect alignment with punch 15 and then clamped into place.

The method of keeping the lower punch 36 in alignment depends somewhat on the shape of tablet being made. When a tablet of irregular outline is used this punch may be kept in alignment by the die itself, if the parts are so arranged that the end of the punch never leaves the die. When cylindrical tablets having a plurality of perforations or an irregular shaped perforation is desired, the radial alignment between the upper and lower punches cannot be maintained by means of the die. Some guiding means, radially adjustable in relation to the position of the upper punch, must be used. I therefore, provide a bushing 31 around the shank of punch 36 and fasten key 35 into the shank of punch 36 so as to engage with a key-way 32 in bushing 31. Punch 36 may then be aligned with punch 15 by turning bushing 31 as desired. Some such means as holes 39 may be provided for the use of a spanner-wrench in turning bushing 31. It will be noted that the perforating rods 21 extend through apertures in the upper face of lower punch 36 and, as a tablet is being compressed, the core-rods enter corresponding apertures in the lower face of upper punch 15. The alignment between the two punches must, therefore, be very accurate and once set it must be maintained, this is accomplished by fastening bushing 31 by means of washer 33 and screw 34 or some similar means.

The bushing 31 also serves the purpose of supporting the core-rod. It may be noticed in Figs. 1 and 2 that a recess 29 is cut in the seat for bushing 31 and into this recess extends the crosshead 28 of the core-rod support 27.

Figure 3:
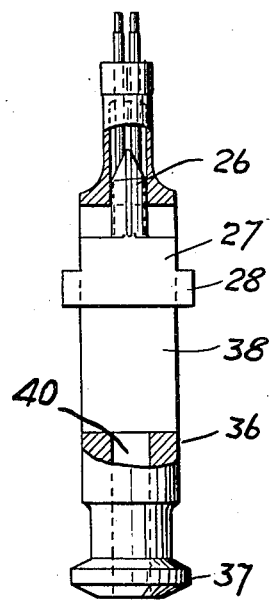
Fig. 3 represents a side elevation at right angles to Fig. 2 with parts in vertical cross section of a lower punch.

The core-rods 21 are usually fitted into the lower punch 36, so that a proper feed or a natural and uniform flow of the material to be compressed into the mold-cell 22 and around the core-rods 21 may be obtained. The lower punch 36 may be made hollow as shown at 40 and may have a slot 38 cut through the shank to receive the core-rod and its holder 28. The core rods 21 (Figs. 2, 3 and 5) may be fastened into a holder 27, which has an extension 26 on the upper side supporting the core-rods 21, and a cross head or wings 28, extending through slot 38 in the punch shank. These wings 28 rest at their lower edges on bushing 31 (Fig. 2) in recess 29. Only sufficient clearance is allowed in recess 29 so as to permit the wings 28 to turn with the lower punch 36 as it is being aligned with upper punch 15 but the core-rod has no endwise movement. Core-rod 21 extends up through mold-cell 22—about flush with the top of die 23—and remains stationary with relation to the endwise movement of the upper and lower punches.

It should be noted (Fig. 1) that the upper punch enters the die 23 a considerable distance in order to compress the material placed in the mold cell 22. This can be seen to best advantage in Fig. 2. As the upper punch is lowered into mold-cell 22 the stationary core-rods 21 enter the apertures 20 provided in the face of punch 15, and thus the material is compressed in the mold around the core-rods 21. Some material and dust may be forced up into the aperture around the core-rods during the compression, and exits are provided for this through cross passages 19 (Fig. 5) in upper punch 15.

A certain amount of the fines in the material or dust will work down through the apertures in the upper face of punch 36 around the core-rods 21 and this material would fill the cavities in the punch body around each core-rod unless means were provided for it to work down past the core-rod support 26. For this purpose the core-rod support 26 (Figs. 6 and 7) is made cylindrical with an upper wedge-shaped face, the cylindrical portion being provided with flutes 53, which flutes extend down the side of the support providing channels or passages for the fine material to escape through the hollow part of the punch.

The method of simultaneous compression preferred in machines of this type is also used in my device—the punches approaching each other at a uniform rate of speed as they pass between rollers 11 and 47—and the pressure is thus applied equally from both sides to the material while the core-rods, although radially adjustable, remain stationary with relation to the endwise movement of the punches.

After the material in the mold-cell 22 has been compressed into a tablet between the rollers 11 and 47, the head 37 of the lower punch 36 strikes cam 45 and lifts the tablet out of the mold, at the same time, of course, stripping it off the core-rods. The punch is lifted until its face is flush or slightly above the face of die 23 and at this point the tablet is removed from the punch by means of some form of a scraper.

Another feature which effects the convenience of operation is the method of providing large keyways 54 in bushing 31 as may be seen in Fig. 8. The large keyways 54 are cut a suitable angle from keyway 32 so that when key 35 is engaging keyway 32 it would be impossible for the wings 28 of core-rod support to come over keyway 54 and permit the core-rod assembly to drop out. This arrangement permits the insertion or removal of the lower punches 36 together with the core-rod 21 without the removal or unclamping of the retaining bushing 31. The punches 36 can be removed without disturbing the bushing by dropping them slightly at the removal position—the plug 42 is first taken out of the cam surface supporting the lower punch so that they may be lowered to disengage key 35 from on the keyway—and then by rotating as needed wings 28 will engage the keyways 54. When replacing the punch again perfect alignment is automatically obtained without resorting to any adjustment of bushing 31.

What is claimed is:

1. In a rotary tablet-compressing machine, the combination comprising, a rotating head, an upper punch, a key holding said upper punch against rotation relative to said head, a lower punch, said punches being mounted in said head for cooperating axial movement relative to each other, a bushing supporting said lower punch in said head, and a second key holding said lower punch against rotation relative to said bushing.

2. In a rotary tablet-compressing machine, the combination comprising, a rotating head, an upper punch, a key holding said upper punch against rotation relative to said head, a lower punch, said punches being mounted in said head for cooperating axial movement relative to each other, a bushing supporting said lower punch in said head, a second key holding said lower punch against rotation relative to said bushing and a disk securing said bushing to said rotating head.

3. In a rotary tablet-compressing machine, the combination comprising, a rotating head, an upper punch, a key holding said upper punch against rotation relative to said head, a lower punch, said punches being mounted in said head for cooperating axial movement relative to each other, a second key holding said lower punch against rotation relative to said head and to said upper punch, and a core-rod mounted within and projecting through said lower punch.

4. In a rotary tablet-compressing machine, the combination comprising, a rotating head, an upper punch, a key holding said upper punch against rotation relative to said head, a lower punch having an axial opening extending through the sides thereof, a holder mounted in said opening and having wings thereon extending through the sides of said lower punch, a core-rod mounted on said holder and projecting through the upper face of said lower punch, said holder having flutes extending axially thereof and providing outlets between said lower punch and said holder, said punches being mounted in said head for cooperating axial movement relative to each other and to said head, and a second key holding said lower punch against rotation relative to said head and to said upper punch.

5. In a rotary tablet-compressing machine, the combination comprising, a rotating head, an upper punch, a key holding said upper punch against rotation relative to said head, a lower punch having an axial opening therein extending through the sides of said lower punch, a holder mounted in said opening and having wings thereon projecting through the sides of said lower punch, a core-rod mounted on said holder and projecting through the upper face of said lower punch, a bushing surrounding a portion of said lower punch and supporting said holder by means of said wings, and a second key between said lower punch and said bushing holding said lower punch against rotation relative to said bushing and said upper punch.

6. In a rotary tablet-compresing machine, the combination comprising, a rotating head, an opper punch, a key holding said upper punch against rotation relative to said head, a lower punch having an axial opening therein extending through the sides of said lower punch, a holder mounted in said opening and having wings thereon projecting through the sides of said lower punch, a core-rod mounted on said holder and projecting through the upper face of said lower punch, a bushing surrounding a portion of said lower punch and having axial keyways therein providing for the passage of the wings on said holder through said keyways during assembly and adapted to support said wings and said holder on the upper surface of said bushing in normal position, a second key located between said bushing and said lower punch and holding said lower punch against rotation relative to said bushing and to said upper punch, and a washer securing said bushing against rotation relative to said rotating head.

7. In a rotary tablet-compressing machine, the combination comprising, a rotating head, an upper punch, a key holding said upper punch against rotation relative to said head, a lower punch, said punches being mounted in said head for cooperating axial movement relative to each other, a second key holding said lower punch against rotation relative to said head and to said upper punch, a core-rod mounted within and projecting through said lower punch, and a plug underlying said lower punch in one position thereof, said plug being detachable to facilitate removal of said lower punch from said head.

LAWRENCE H. BAILEY.